United States Patent
Ueda et al.

[11] Patent Number: 5,058,558
[45] Date of Patent: Oct. 22, 1991

[54] AIR FEEDING SYSTEM FOR A VEHICLE ENGINE EQUIPPED WITH A SUPERCHARGER

[75] Inventors: Kazuhiko Ueda, Higashihiroshima; Hiroyuki Oda, Hiroshima; Kazuhiko Hashimoto, Hiroshima; Kouichi Hatamura, Hiroshima; Tsuyoshi Goto, Hiroshima; Takashi Ohtsuru, Higashihiroshima; Shigeo Tabata, Hiroshima, all of Japan

[73] Assignee: Mazda Motor Corporation, Hiroshima, Japan

[21] Appl. No.: 416,777

[22] Filed: Oct. 4, 1989

[30] Foreign Application Priority Data

Oct. 7, 1988 [JP] Japan .................................. 63-254467
Mar. 31, 1989 [JP] Japan ..................................... 1-83159

[51] Int. Cl.⁵ ........................ F02B 33/44; B60K 13/02
[52] U.S. Cl. ................................ 123/559.1; 180/68.3
[58] Field of Search ..................... 123/559.1; 60/605.1; 180/68.3

[56] References Cited

U.S. PATENT DOCUMENTS 4,896,734 1/1990 Horiuchi et al. .................... 180/68.3

FOREIGN PATENT DOCUMENTS 93623 4/1988 Japan .

*Primary Examiner*—Michael Koczo
*Attorney, Agent, or Firm*—Sixbey, Friedman, Leedom & Ferguson

[57] ABSTRACT

An air feeding system for a vehicle engine equipped with a supercharger comprises an inlet passage provided in an engine room with its first section interconnecting an air cleaner and a throttle valve, its second section interconnecting the throttle valve and the supercharger, and its third section interconnecting the supercharger and an engine body of the vehicle engine for feeding a cylinder in the engine body with intake air introduced through the air cleaner into the first section. The air cleaner is disposed at a front portion of one side half of the engine room and the supercharge is disposed in the other side half of the engine room. A part of the inlet passage including the first and second series is arranged to extend backward from the air cleaner and then to extend further along a dash panel forming a rear end of the engine room from one side half to the other side half of the engine room so as to reach temperature.

15 Claims, 12 Drawing Sheets

AIR FEEDING SYSTEM FOR A VEHICLE ENGINE EQUIPPED WITH A SUPERCHARGER

BACKGROUND OF THE INVENTION

1. Field of the Invention

The present invention relates generally to an air feeding system for a vehicle engine equipped with a supercharger, and more particularly, to a system for feeding air to a cylinder of an internal combustion engine equipped with a supercharger to be used in a vehicle, in which an air cleaner, a supercharger and an engine body are successively interconnected through a plurality of portions of an inlet passage.

2. Description of the Prior Art

In one example of an internal combustion engine equipped with an engine-driven supercharger, an air cleaner, a throttle valve and the engine-driven supercharger are disposed in an inlet passage from the upstream portion to the downstream portion thereof, as disclosed in the Japanese patent application published before examination under publication number 62-178730. The inlet passage is ordinarily provided with a bypass extending from a portion of the inlet passage downstream of the throttle valve to detour or bypass the supercharger. An air relief valve is also provided for the bypass to control air flow in the bypass so as to adjust intake air mass flow supplied to the supercharger. Further, an intercooler is usually disposed between the supercharger and an intake manifold connected to an engine body of the engine for cooling intake air which is compressed by the supercharger, and for supplying same to a cylinder of the engine body.

In previously proposed vehicles each employing the internal combustion engine equipped with the engine-driven supercharger, usually the air cleaner, supercharger and intercooler are arranged to be positioned on the same side of the engine body of the engine in an engine room with the intention of having an air feeding system, which comprises an inlet passage and the air cleaner, supercharger and intercooler interconnected through portions of the inlet passage, reduced in volume. Such an arrangement is shown in the Japanese patent application published before examination under publication number 63-93623. In such a case, it is desired that the air cleaner which is considerably large in volume is usually positioned at a front portion of the engine room so as to introduce fresh cool air into the inlet passage and thereby to improve air charging efficiency in the cylinder of the engine body. In addition, the intercooler which requires a relatively large space to be placed therein is also positioned at the front portion of the engine room so as to improve the cooling effect of the intake air compressed by the supercharger. It is also desired that the supercharger which is considerably large in volume is positioned at a portion of the inlet passage downstream from the throttle valve so as to effectively suppress noise caused by intake air flowing through the supercharger to get away from portions of the inlet passage upstream of the supercharger. It is further desired that the throttle valve is positioned to be close to a cabin so as to be smoothly controlled by a wire which transmits movements of an accelerating pedal disposed in the cabin to the throttle valve.

However, in practice, it is quite difficult to have such an air feeding system in which the air cleaner, supercharger and intercooler are positioned on the same side of the engine body in the engine room in the manner that each of the above described desires is satisfied. Further, even if the above mentioned air feeding system is obtained under a hood covering the engine room in some way, the inlet passage must be formed to have a number of bent portions and therefore resistance against intake air flow through the inlet passage must be undesirably increased thereby reducing power of the engine. Especially, in the case of a vehicle employing a V-type engine which is usually accompanied with relatively small spaces formed on both sides thereof in an engine room, the problems mentioned above become more conspicuous.

In the field of the V-type engine, there has been proposed an air feeding system in which the engine-driven supercharger is disposed between a pair of cylinder banks forming V-shaped front and rear ends under a hood covering an engine room, as shown in the Japanese utility model application published before examination under publication number 61-1624. However, when the air feeding system thus proposed is adopted for the V-type engine, the size of the engine is increased in height and therefore a general desire of reducing the height of the hood covering the engine room cannot be satisfied.

OBJECTS AND SUMMARY OF THE INVENTION

Accordingly, it is an object of the present invention to provide an air feeding system for a vehicle engine equipped with a supercharger which avoids the aforementioned problems and disadvantages encountered with the prior art.

Another object of the present invention is to provide an air feeding system for a vehicle engine equipped with a supercharger, in which each of main elements including an air cleaner and the supercharger is disposed to reduce the size of the air feeding system and to operate effectively in and which inlet passage is provided having portions successively interconnecting the main elements with reduced resistance against intake air flowing therethrough.

A further object of the present invention is to provide an air feeding system for a vehicle engine equipped with a supercharger, in which each of main elements including an air cleaner and the supercharger is formed to have a size sufficient for effective operation and disposed at a desired position in an engine room, with an inlet passage having portions successively interconnecting the main elements formed without a portion bent at an acute angle.

In accordance with the present invention, there is provided an air feeding system for a vehicle engine equipped with a supercharger, which comprises an inlet passage provided in an engine room with a first section thereof interconnecting an air cleaner and a throttle valve, a second section thereof interconnecting the throttle valve and the supercharger, and a third section thereof interconnecting the supercharger and an engine body of the vehicle engine for feeding a cylinder in the engine body, with intake air introduced through the air cleaner into the first section. The air cleaner is disposed at a front portion of one side half of the engine room, the supercharger is disposed in the other side half of the engine room, and a part of the inlet passage including the first and second sections is arranged to extend backward from the air cleaner and then to extend further along a dash panel forming a rear end of the engine room from one side half to the other side half of the engine room so as to reach the supercharger.

The front portion of the engine room is the leading portion when the vehicle is traveling in a forward direction, with the side halves extending from a central portion of the engine room in directions perpendicular to the forward direction.

In one embodiment of the air feeding system according to the present invention, the third section of the inlet passage interconnecting the supercharger and the engine body is provided thereon with an intercooler which is disposed at a front portion of the other side half of the engine room.

In the air feeding system thus constituted in accordance with the present invention, since the air cleaner is positioned at the front portion of one side half of the engine room, fresh cool air is introduced through the air cleaner into the inlet passage and therefore air charging efficiency in the cylinder of the engine body is improved. The air cleaner and the supercharger are positioned in both side halves of the engine room, respectively, and therefore each of the air cleaner and the supercharger can be provided with a size sufficient for effective operation without increasing the size of the air feeding system. Further, since the inlet passage is arranged to extend backward (i.e., in a direction opposite to the forward vehicle direction) from the front portion of one side half of the engine room to the other side half of the engine room through a rear portion, the inlet passage can be formed without a portion bent at an acute angle and thereby provided with reduced resistance against intake air flowing therethrough and the throttle valve can be disposed at a position close sufficiently to the dash panel. In addition, since the inlet passage is arranged not to pass highly over the engine body, a hood covering the engine room can be reduced in height.

The above, and other objects, features and advantages of the present invention will become apparent from the following detailed description which is to be read in conjunction with the accompanying drawings.

DESCRIPTION OF THE PREFERRED EMBODIMENTS

Figure 1:
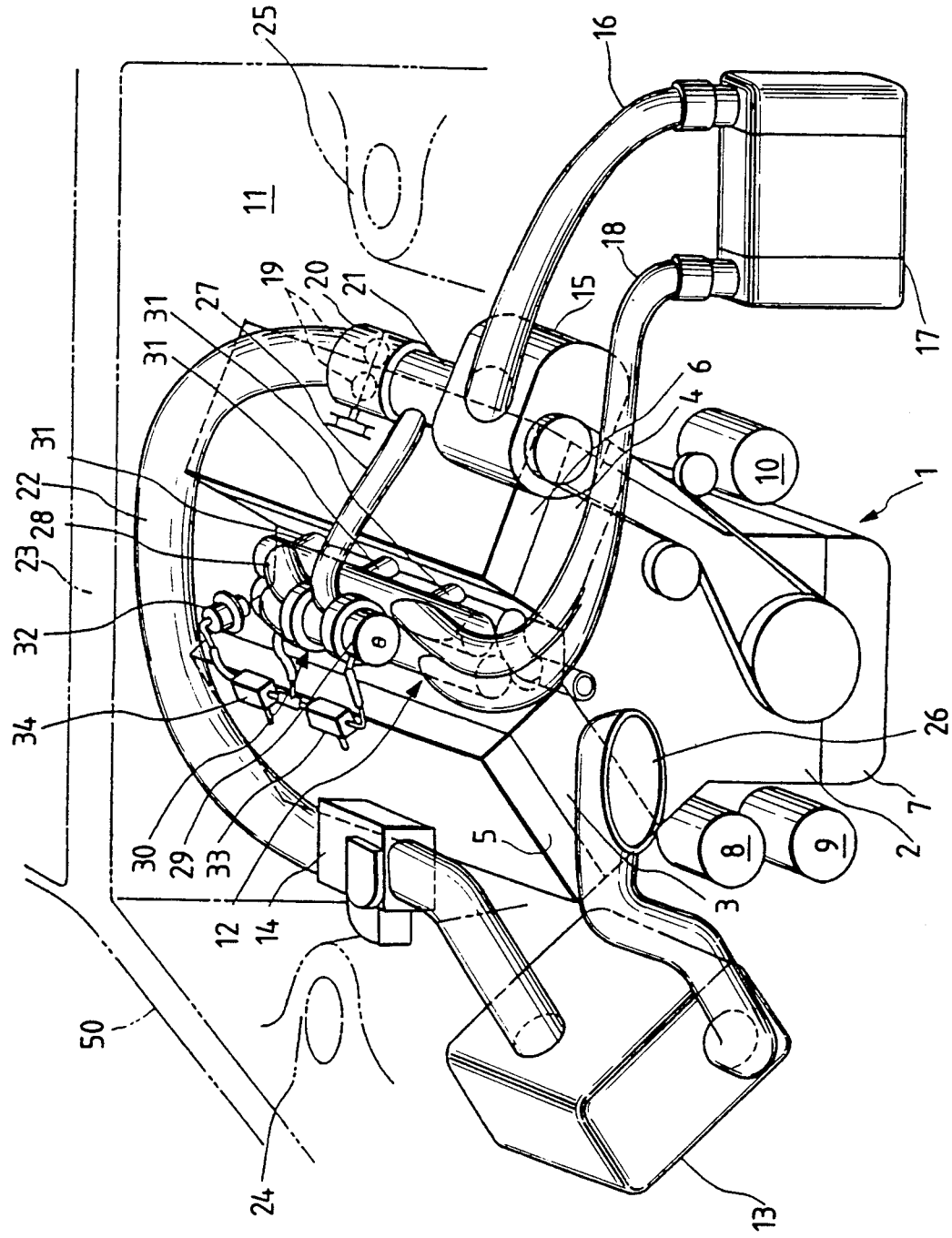
FIG. 1 is a schematic illustration showing an embodiment of air feeding system for a vehicle engine equipped with a supercharger according to the present invention, together with the vehicle engine to which the embodiment is applied.
Figure 2:
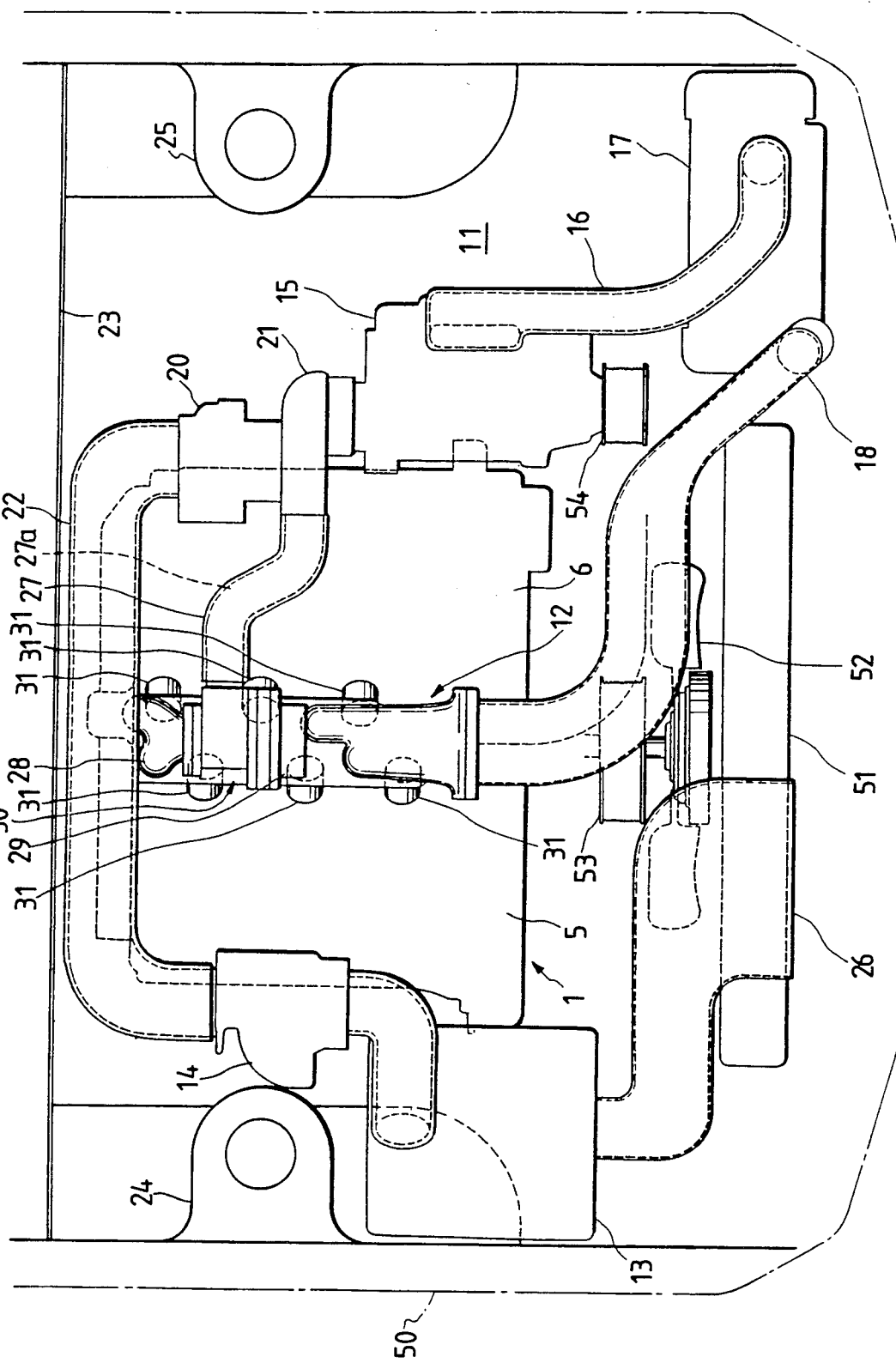
FIG. 2 is a schematic plan view showing the embodiment shown in FIG. 1.
Figure 3:
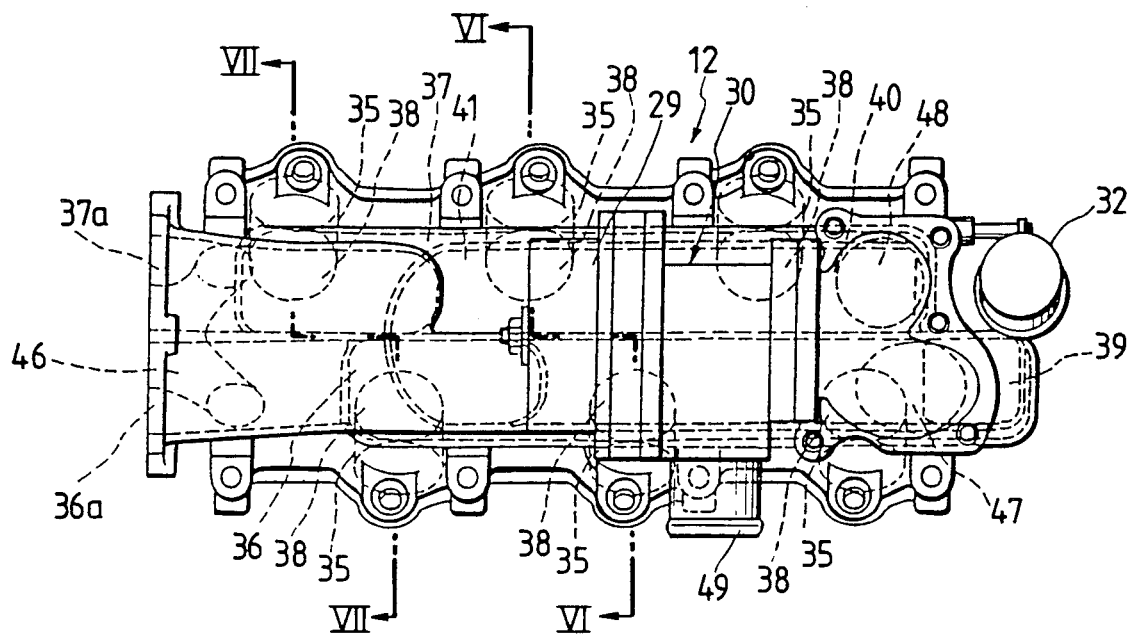
FIGS. 3 and 4 are plan and side views showing an intake manifold used in the embodiment shown in FIG. 1.
Figure 4:
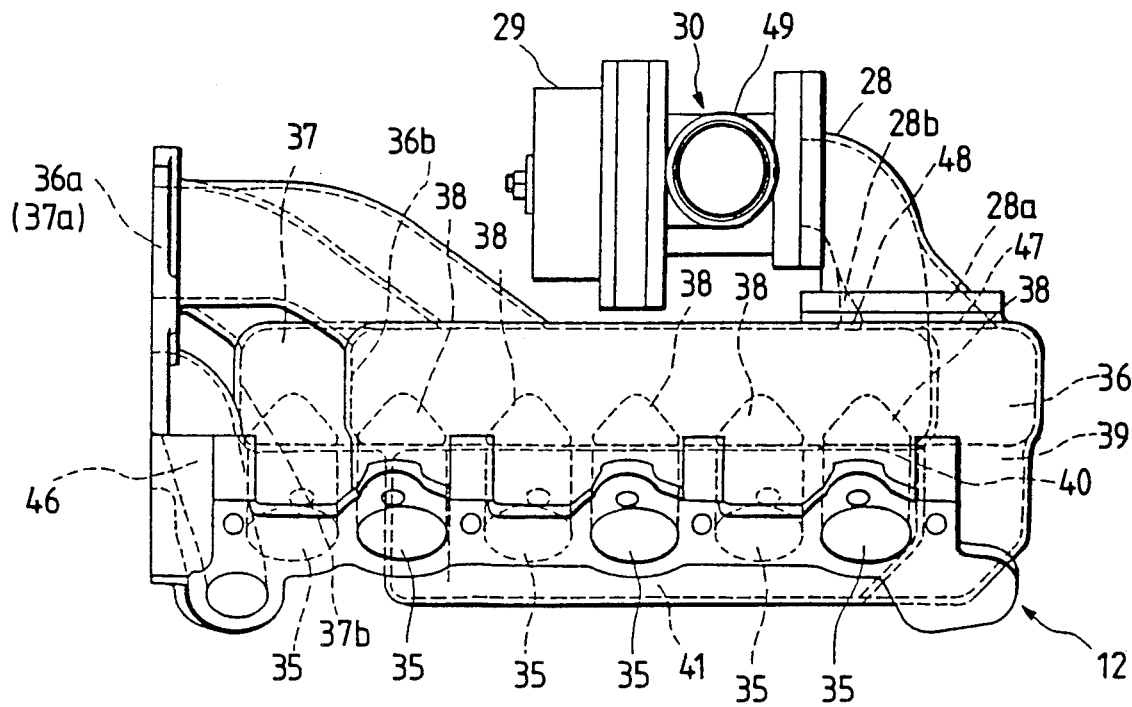

An embodiment of air feeding system for a vehicle engine equipped with a supercharger according to the present invention is shown in FIGS. 1 and 2. The embodiment is applied to an vehicle engine of the V-type with six cylinders.

Referring to FIGS. 1 and 2, an engine room 11 is formed in a front portion of a vehicle body 50 to be covered by a hood. The rear end of the engine room 11 is formed by a dash panel 23 which is a part of the vehicle body and separates the engine room 11 from a cabin formed in the vehicle body 50. A couple of suspension towers 24 and 25 are projected at right and left side portions of the engine room 11, respectively.

An engine body 1 which is placed in the engine room 11 has a cylinder block 2, a couple of cylinder heads 3 and 4 disposed on the cylinder block 2 and a couple of head covers 5 and 6 covering the cylinder heads 3 and 4, respectively, which are arranged to form a couple of cylinder banks with front and rear ends formed in the V-shape. In the cylinder bank including the cylinder head 3, first, third and fifth cylinders constituting a first group of cylinders operative to work with their respective suction strokes which are not successive to one another are contained, and in the cylinder bank including the cylinder head 4, second, fourth and sixth cylinders constituting a second group of cylinders operative to work with their respective suction strokes which are not successive to one another are contained. The engine body 1 has also an oil pan 7 attached to the bottom of the cylinder block 2. Further, auxiliary equipments 8, 9 and 10 including an alternator are disposed at lower positions on both side of the engine body 1 and an intake manifold 12 is disposed between the cylinder heads 3 and 4 at the top of the engine body 1.

One example of the air feeding system according to the present invention, which is applied to the engine body, comprises an inlet passage provided in the engine room 11, with the feeding system divided into a plurality of portions which interconnect: (1) air cleaner 13 and an air flow sensor 14; (2) the air flow sensor 14 and a throttle body 20, with the throttle body including a couple of throttle valves 19; (3) the throttle body 20 and an engine-driven supercharger 15; (4) the engine-driven supercharger 14 and an engine intercooler 17; and (5) the intercooler 17 and the cylinder heads 3 and 4 through the intake manifold 12 mentioned above, respectively. The system thus supplies the cylinders in the engine body 1 with intake air.

The air cleaner 13 is disposed at a front portion of the right side half of the engine room 11 to be positioned in front of the suspension tower 24 and the air flow sensor 14 is disposed behind the air cleaner 13 to be positioned above the head cover 5 and inside the suspension tower 24 for detecting intake air mass flow in the portion of the inlet passage by which the air cleaner 13 and the air flow sensor 14 are interconnected. The engine-driven supercharger 15 is disposed in the left side half of the engine room 11 and the intercooler 17 is disposed in front of the engine-driven supercharger 15. The engine-driven supercharger 15 and the intercooler 17 are interconnected through an air pipe 16 which constitutes one of the portions of the inlet passage, and the intercooler 17 and the intake manifold 12 are interconnected through an air pipe 18 which also constitutes one of the portions of the inlet passage. Further, the throttle body 20 is disposed behind the engine-driven supercharger 15 to be positioned above the head cover 6 and inside the suspension tower 25, and the throttle body 20 and the engine-driven supercharger 15 are interconnected through a connecting pipe 21 which constitutes one of the portions of the inlet passage.

The air flow sensor 14 and the throttle body 20 are interconnected through an air duct 22 which constitutes one of the portions of the inlet passage. The air duct 22 is arranged to extend backward from the air flow sensor 14, then to extend along a path between the engine body 1 and the dash panel 23 from the right side half of the engine room 11 to the left side half of the engine room 11, and further to extend forward so as to reach the throttle body 20.

An air intake 26 extending forward from the air cleaner 13 is positioned to open outside in front of the engine body 1.

The connecting pipe 21 between the throttle body 20 and the engine-driven supercharger 15 communicates through a bypass pipe 27, with a downstream end portion of the intake manifold 12. The bypass pipe 27 extends to cross the head cover 6 from the connecting pipe 21 and is connected at its one end to a connecting pipe 28 extending from the downstream end portion of the intake manifold 12. At the connection between the bypass pipe 27 and the connecting pipe 28, a valve body 30 accompanied with a diaphragm actuator 29 is provided. Further, at the downstream end portion of the intake manifold 12, a diaphragm actuator 32 is provided for driving a shutter valve in each of branch pipes 31 of the intake manifold 12. Three-way solenoid valves 33 and 34 are provided above the head cover 5 for supplying respectively the diaphragm actuators 29 and 32 with a negative pressure and the atmospheric pressure selectively.

In the engine room 11, a radiator 51, a cooling fan 52, and pulleys 53 and 54 for driving the engine-driven supercharger 15 are also provided.

Now, the intake manifold 12 will be explained in detail with reference to FIGS. 3 to 7.

The intake manifold 12 is provided with separated inlet passages 35 each formed by the branch pipe 31, a collecting passage 36 from which three inlet passages 35 extend to the cylinder bank including the cylinder head 3, and a collecting passage 37 from which another three inlet passages 35 extend to the cylinder bank including the cylinder head 4. Each of the collecting passages 36 and 37 is shaped in a size fit for air supply under the resonance effect and extends along the longitudinal direction of the intake manifold 12. The separated inlet passages 35 are connected respectively to openings 38 provided at regular intervals on a side wall of the inlet manifold 12 forming each of the collecting passage 36 and 37.

Figure 5:
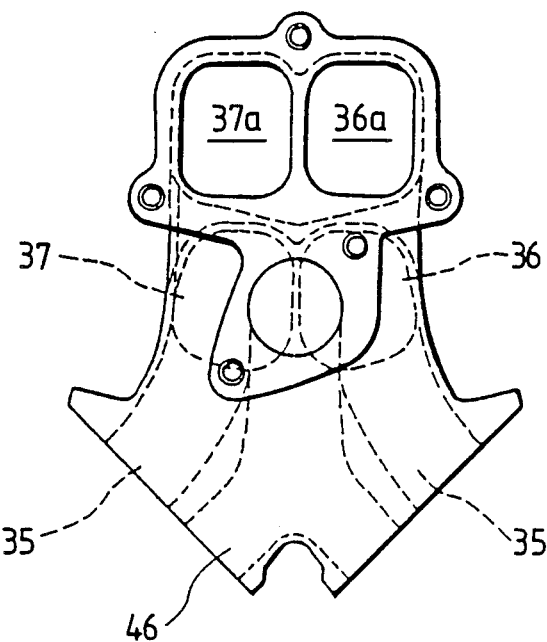
FIG. 5 is a front view of the intake manifold shown in FIGS. 3 and 4.

The collecting passages 36 and 37 have respective air guides which extend upward to be forwardly bent from front ends of the collecting passages 36 and 37 limited by front walls 36b and 37b of the intake manifold 12, respectively, and are provided with inlet openings 36a and 37a, respectively, as shown in FIG. 5. The inlet openings 36a and 37a are connected through the air pipe 18 to the intercooler 17. The air pipe 18 is provided therein with an air passage having an upstream opening connected with the intercooler 17 and two separated downstream openings connected with the inlet openings 36a and 37a provided to the collecting passages 36 and 37, respectively. This results in that the collecting passages 36 and 37 are substantially interconnected at their upstream portions.

Figure 6:
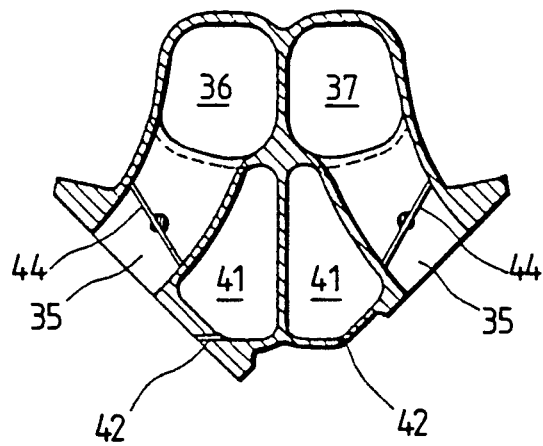
FIG. 6 is a schematic cross-sectional view taken on line VI—VI of FIG. 3.

Rectangular openings 39 and 40 are formed at the bottoms of rear ends of the collecting passages 36 and 37, respectively, to be interconnected through communicating passages 41 provided under the bottoms of the collecting passages 36 and 37. As shown in FIG. 6, the communicating passages 41 are formed between the separated inlet passages 35 (connected to the cylinder bank including the cylinder head 3) and the separated inlet passages 35 (connected to the cylinder bank including the cylinder head 4), and extend along the bottoms of the collecting passages 36 and 37, respectively. Since the collecting passages 36 and 37 are also interconnected at their downstream portions through the communicating passages 41 which is relatively long, air supply from the separated inlet passages 35 to the cylinders in the cylinder banks are improved due to resonance effect especially when the engine body 1 operates at relatively low engine speed. Each of the communicating passages 41 is provided at its bottom with a drain 42 for discharging water or oil.

Figure 7:
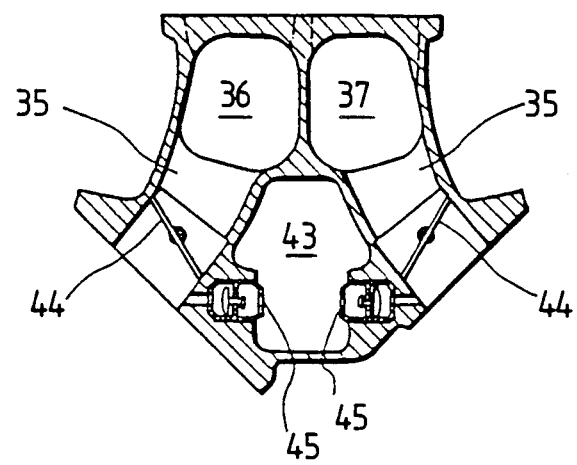
FIG. 7 is a schematic cross-sectional view taken on line VII—VII of FIG. 3.

Under the front ends of the collecting passages 36 and 37, a vacuum chamber 43 is formed between the separated inlet passages 35 connected to the cylinder bank including the cylinder head 3 and the separated inlet passages 35 connected to the cylinder bank including the cylinder head 4, as shown in FIG. 7. The vacuum chamber 43 is used for accumulating negative pressure which is to be supplied to the diaphragm actuator 32 for driving a shutter valve 44 provided in each of the separated inlet passages 35 and to the diaphragm actuator 29 for driving the relief valve in the valve body 30. The negative pressure is introduced into the vacuum chamber 43 through check valves 45 from the separated inlet passages 35.

Figure 8:
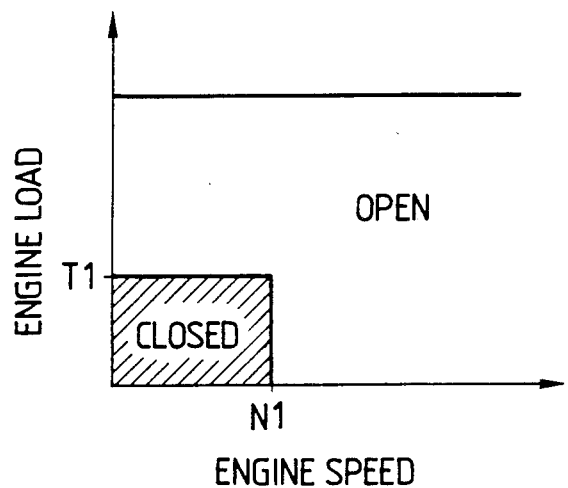
FIG. 8 is a characteristic diagram used for explaining the operation of a shutter valve provided in the intake manifold shown in FIGS. 3 and 4.

The shutter valve 44 is provided for preventing intake air from flowing back to the collecting passages 36 and 37 especially when the engine body 1 operates with relatively small load at relatively low engine speed. In the case where the engine body 1 operates with a relatively small load (for example, smaller than Tl in FIG. 8) at a relatively low engine speed (for example, lower than Nl in FIG. 8), the negative pressure accumulated in the vacuum chamber 43 is supplied through the three-way solenoid valve 34 to the diaphragm actuator 32 and thereby the shutter valves 44 are closed in such an operation manner as shown in FIG. 8.

Under the air guides of the collecting passages 36 and 37 provided with the inlet openings 36a and 37a respectively, an cooling water pipe 46 is disposed with a upstream opening thereof formed in the vicinity of the inlet openings 36a and 37a of the collecting passages 36 and 37 and two separated downstream openings thereof connected to the cylinder banks, respectively.

Figure 9:
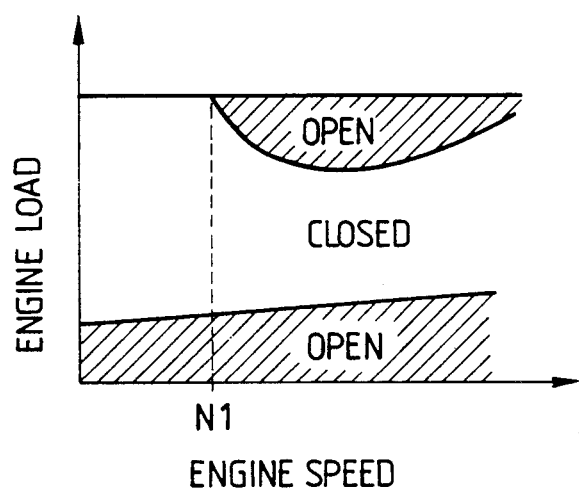
FIG. 9 is a characteristic diagram used for explaining the operation of a relief valve provided in the intake manifold shown in FIGS. 3 and 4.

Further, circular openings 47 and 48 are formed on the tops of the rear ends of the collecting passages 36 and 37, respectively, to be connected with one end of the connecting pipe 28 which is provided therein with two separated air passages 28a and 28b. The separated air passage 28a is connected through the opening 47 to the collecting passage 36 and the separated air passage 28b is connected through the opening 48 to the collecting passage 37. The other end of the connecting pipe 28 is connected to the valve body 30 which has an inlet pipe 49 connected with the bypass pipe 27. The bypass pipe 27 and the connecting pipe 28 constitute an intake air bypass 27a which detours the engine-driven supercharger 15. The relief valve in the valve body 30 is operative to open the intake air bypass 27a to cause intake air to detour the engine-driven supercharger 15 when the engine body 1 operates with relatively small load or the pressure of intake air compressed by the engine-driven supercharger 15 exceeds a predetermined relatively large value, in such an operation manner as shown in FIG. 9.

With the embodiment described above, the following advantages can be obtained.

Since the air cleaner 13 is disposed at the front portion of the right side half of the engine room 11 to be positioned in front of the suspension tower 24, an air cleaner with relatively large capacity can be used as the air cleaner 13 and fresh cool air is introduced through the air cleaner 13 into the inlet passage and therefore air charging efficiency in the cylinders provided in the engine body 1 is improved. Further, the intercooler 17 is disposed at the front portion of the left side half of the engine room 11 to be positioned in front of the suspension tower 25, an intercooler with relatively large capacity can be used as the intercooler 17 and intake air compressed by the engine-driven supercharger 15 is effectively cooled down.

Since the engine-driven supercharger 15 is disposed in the left side half of the engine room 11 to be opposite to the air cleaner 13 with the engine body 1 therebetween, the throttle valve which is required to be arranged at a position upstream to the engine-driven supercharger 15 can be positioned behind the engine-driven supercharger 15 to be close to the cabin separated from the engine room 1 by the dash panel 23.

Since the air flow sensor 14 and the throttle body 20 are interconnected through the air duct which is arranged to extend along the path between the engine body 1 and the dash panel 23 from the right side half of the engine room 11 to the left side half of the engine room 11, the inlet passage feeding the cylinders in the engine body 1 with intake air is formed without a portion bent at an acute angle and thereby provided with reduced resistance against intake air flowing therethrough. Further, the distance from the air cleaner 13 to the engine-driven supercharger 15 measured along the inlet passage is relatively long and therefore noise caused by intake air flow through the engine-driven supercharger 15 to get away from the air cleaner 13 is effectively suppressed.

Since the bypass pipe 27 extends to cross the head cover 6 from the connecting pipe 21 to the connecting pipe 28 extending from the collecting passages 36 and 37 in the intake manifold 12, the intake air bypass 27a constituted by the bypass pipe 27 and the connecting pipe 28 is reduced in length and provided with reduced resistance against intake air flowing therethrough when the engine body 1 operates with relatively small load. Further, since the valve body 30 containing the relief valve for opening the intake air bypass 27a selectively is disposed between the cylinder banks together with the intake manifold 12, a space between the cylinder banks is advantageously utilized so that the air feeding system is made compact.

Another embodiment of air feeding system for a vehicle engine equipped with an supercharger according to the present invention is shown in FIGS. 10 to 15. This embodiment is also applied to an vehicle engine of the V-type with six cylinders.

Figure 10:
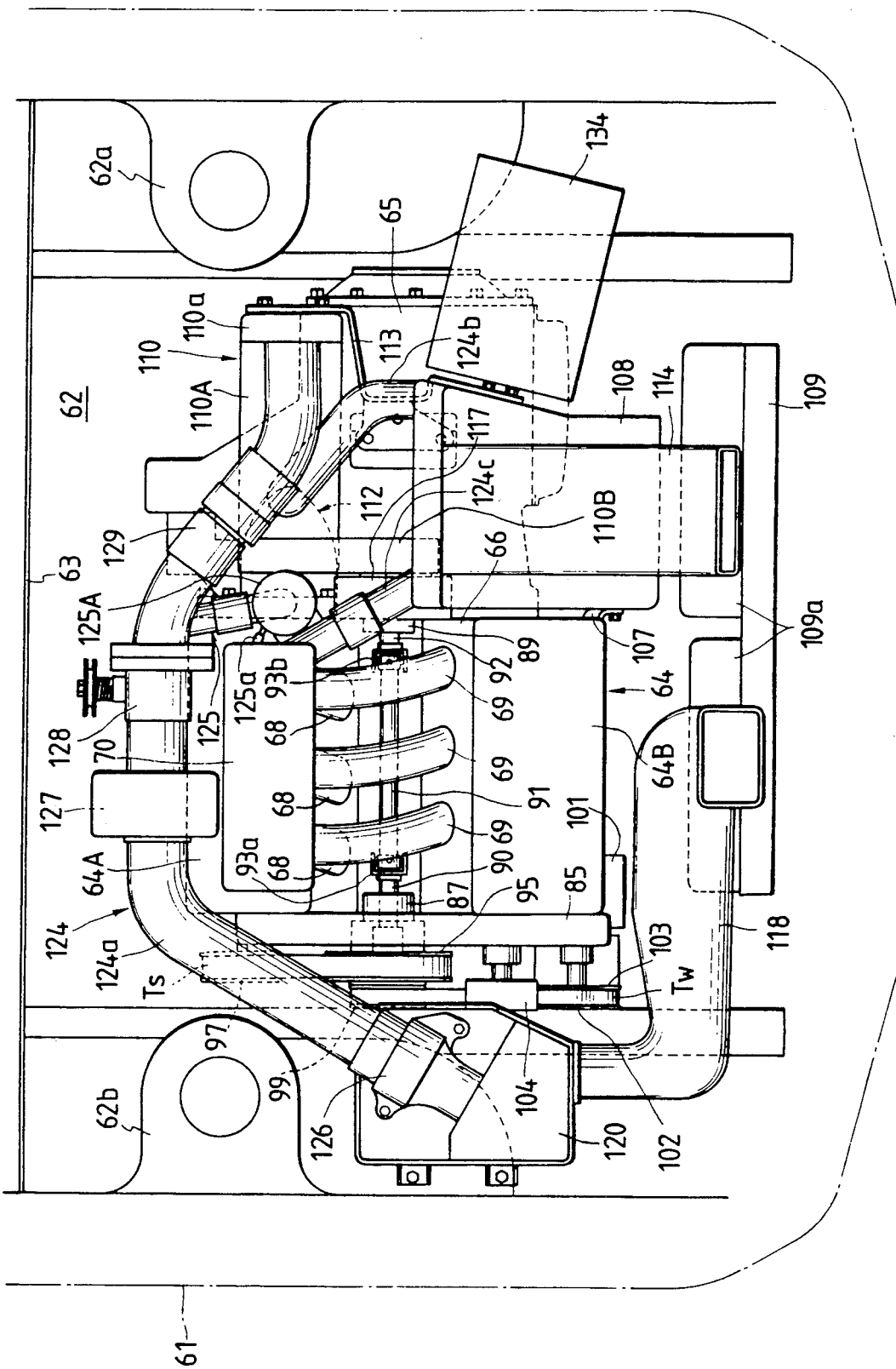
FIG. 10 is a schematic illustration showing another embodiment of air feeding system for a vehicle engine equipped with a supercharger according to the present invention, together with the vehicle engine to which the embodiment is applied.

Referring to FIG. 10, an engine room 62 is formed in a front portion of a vehicle body 61 to be covered by a hood. The rear end of the engine room 62 is formed by a dash panel 63 which is a part of the vehicle body 61 and separates the engine room 62 from a cabin formed in the vehicle body 61. A couple of suspension towers 62a and 62b are projected at right and left side portions of the engine room 62, respectively.

In the engine room 62, an engine body 64 and a transmission case 65 in which a power transmitting mechanism including a transmission and a differential gear arrangement are contained are transversely mounted on the vehicle body 61.

Figure 11:
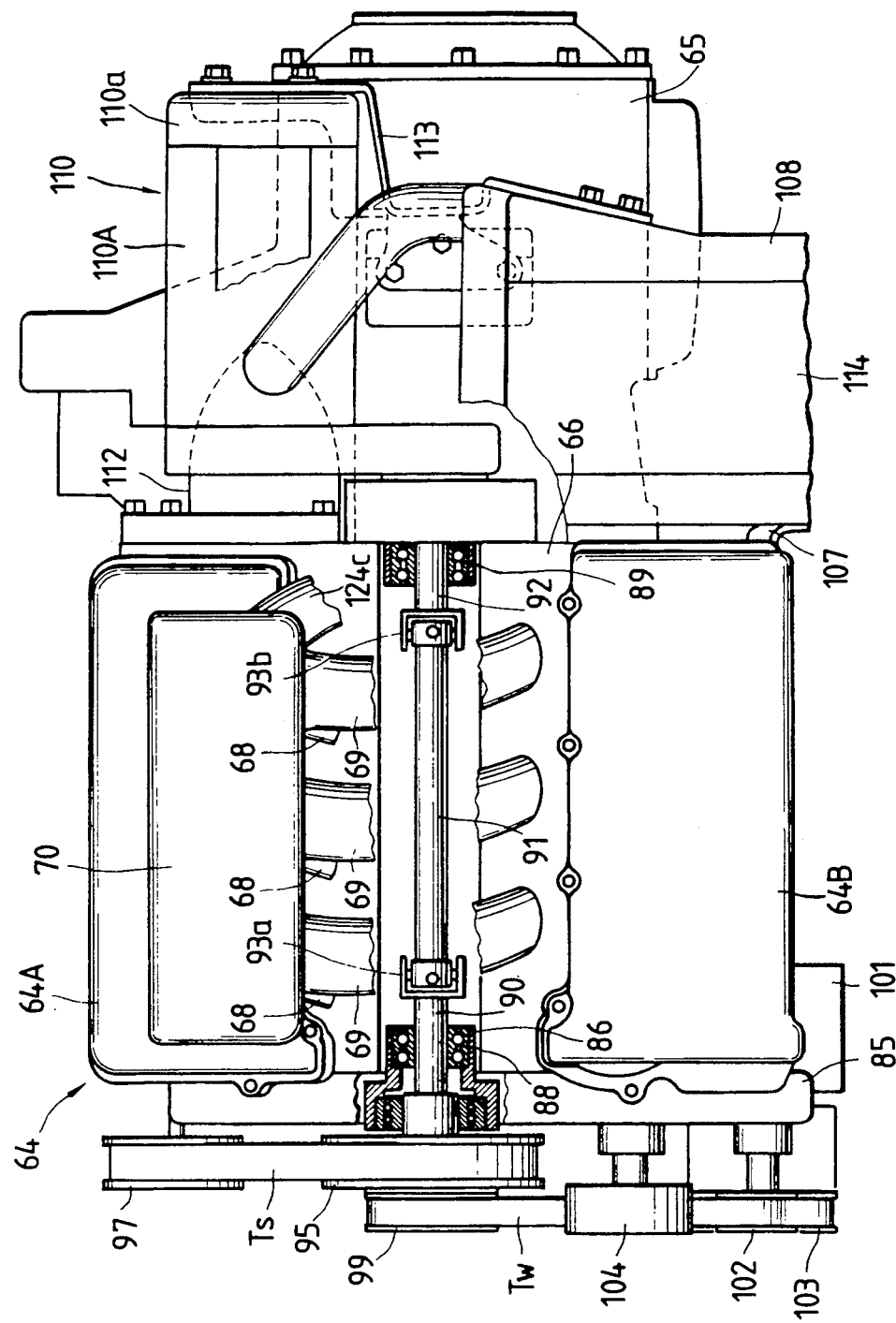
FIG. 11 is a schematic enlarged plan view of the vehicle engine shown in FIG. 10.
Figure 12:
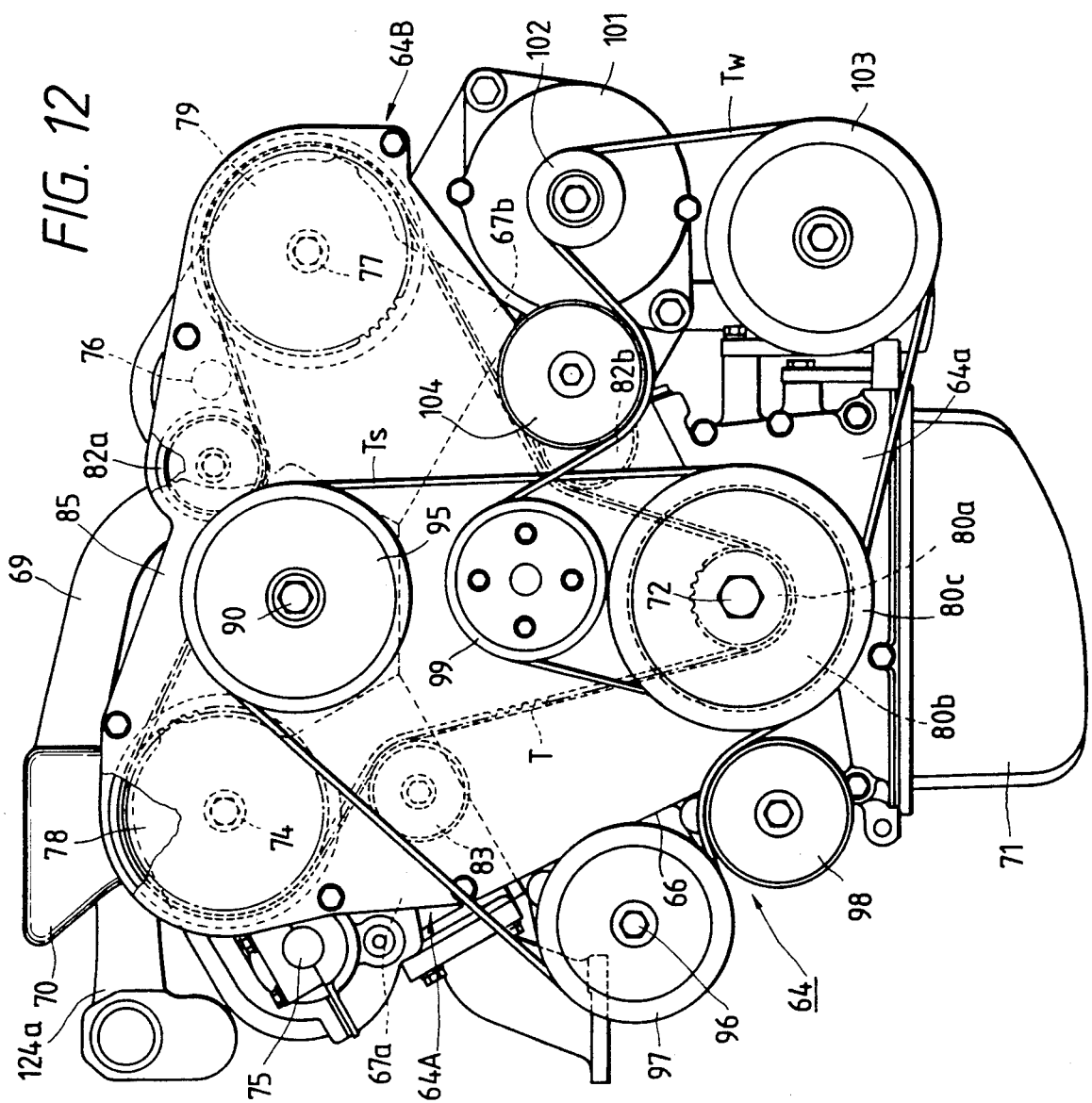
FIG. 12 is a schematic front view of the vehicle engine shown in FIG. 10.

As shown also in FIGS. 11 and 12, the engine body 64 has a cylinder block 66 and a couple of cylinder heads 67a and 67b disposed on the cylinder block 66, which are arranged to form first and second cylinder banks 64A and 64B with left and right side ends formed in the V-shape. In the first cylinder bank 64A, first, third and fifth cylinders operative to work with their respective suction strokes which are not successive to one another are contained, and in the second cylinder bank 64B, second, fourth and sixth cylinders operative to work with their respective suction strokes which are not successive to one another are contained. The engine body 64 has also an oil pan 71 attached to the bottom of the cylinder block 66.

In the cylinder block 66, a crank shaft 72 is disposed to extend in the direction of the width of the vehicle body 61. Further, in the first cylinder bank 64A, a pair of camshafts 74 and 75 are disposed to extend along the crank shaft 72 for driving an intake valve provided for each of the first, second and third cylinders and an exhaust valve provided for each of the first, second and third cylinders, respectively. In the second cylinder bank 64B, a pair of camshafts 76 and 77 are disposed to extend along the crank shaft 72 for driving an intake valve provided for each of the second, fourth and sixth cylinders and an exhaust valve provided for each of the second, fourth and sixth cylinders, respectively.

A surge tank 70 is disposed above the first cylinder bank 64A. The surge tank 70 is connected through three separated inlet passages 68 to the first, third and fifth cylinders in the first cylinder bank 64A and through another three separated inlet passages 69 to the second, fourth and sixth cylinders in the second cylinder bank 64B.

End portions of the camshafts 74 and 77 and an end portion of the crank shaft 72 are projected from a right side wall 64a of the engine body 64 which is close to the suspension tower 62a to be provided thereon with cam pulleys 78 and 79 and a crank pulley 80a, respectively. A cogged endless belt T is engaged with each of the cam pulleys 78 and 79 and the crank pulley 80a. Idlers 82a and 82b and a tension adjustor 83 are also provided on the right side wall 64a of the engine body 64 to come into contact with the cogged endless belt T. The right side wall 64a on which the cam pulleys 78 and 79, the crank pulley 80a, the cogged endless belt T and so on are provided is covered by a belt cover 85.

Figure 13:
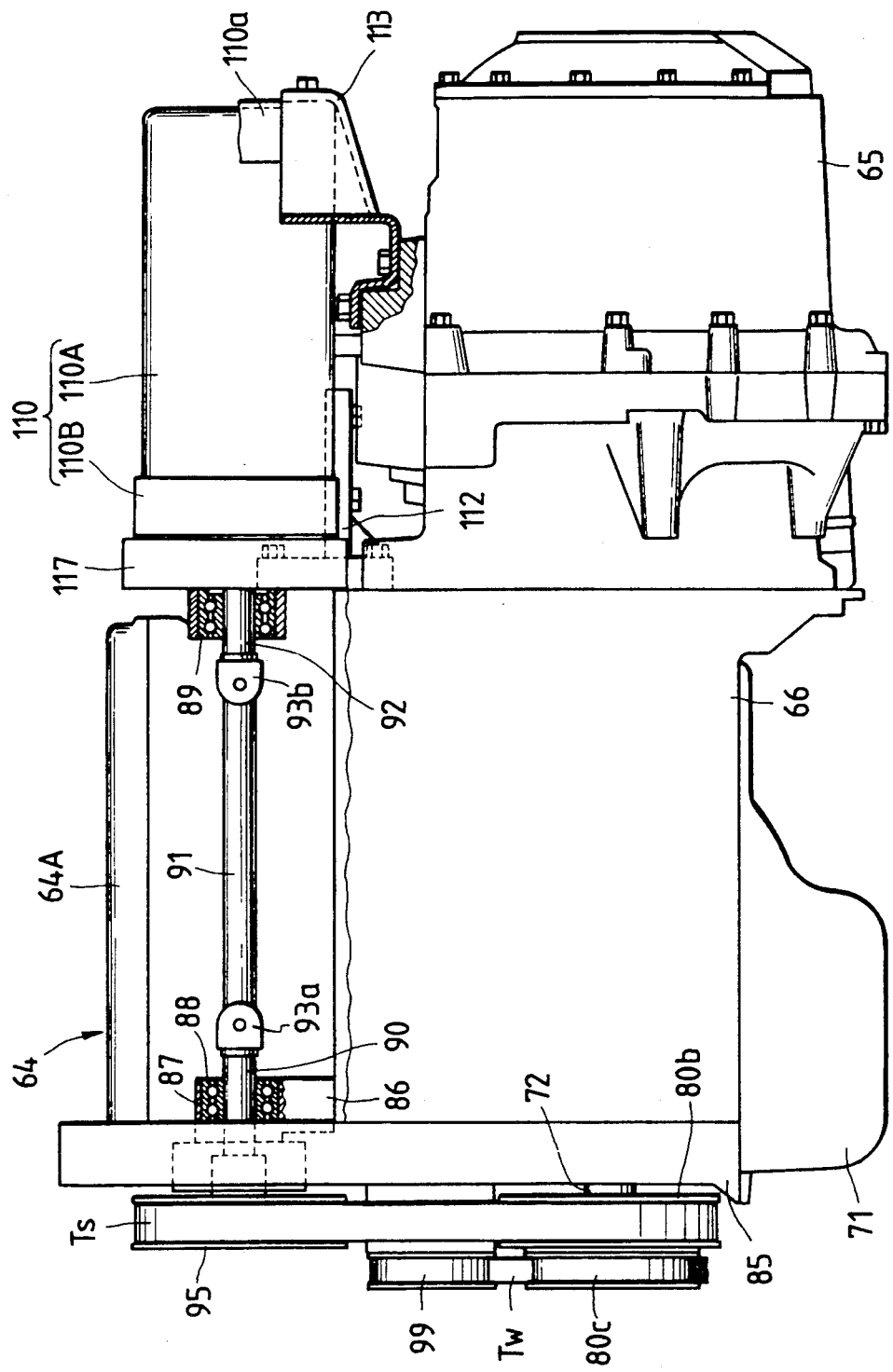
FIG. 13 is a schematic enlarged side view of the vehicle engine shown in FIG. 10.
Figure 14:
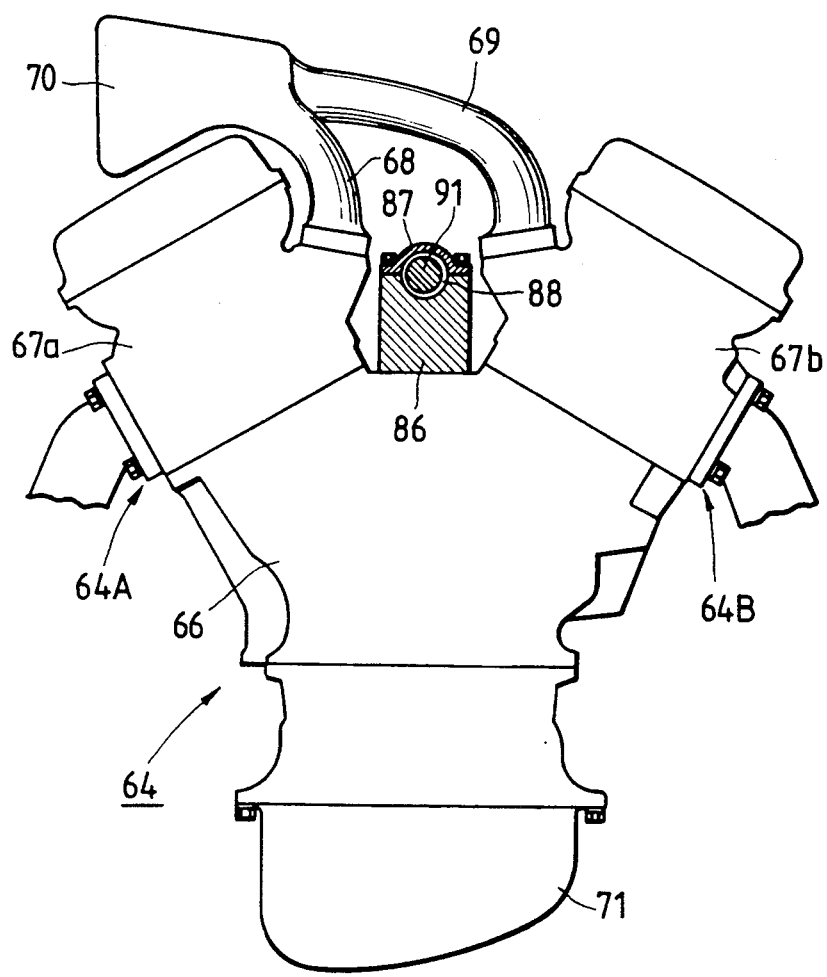
FIG. 14 is a schematic illustration used for explaining the configuration of the engine shown in FIG. 10.

As shown in FIGS. 13 and 14, a bearing member 88 which comprises a base 86 and a cap 87 attached to the base 87 with bolts is provided to be close to the belt cover 85 on an end of the upper surface of the cylinder block 66 appearing between the first and second cylinder banks 64A and 64B. A rotary shaft 91 and a couple of rotary shafts 90 and 92 coupled through joints 93a and 93b with both ends of the rotary shaft 91 respectively are rotatably supported by the bearing member 88 and a bearing member 89 which is attached to an electromagnetic clutch 117 described later so as to be put between a portion of the cylinder head 67a to which the separated inlet passages 68 are connected and a portion of the cylinder head 67b to which the separated inlet passages 69 are connected.

One end of the rotary shaft 90 is projected outward from the belt cover 85 to be provided thereon with a pulley 95. A belt Ts is engaged with each of the pulley 95, a pulley 97 mounted on a rotary shaft 96 of an oil pump fixed to the first cylinder bank 64A and a crank pulley 80b mounted on the end portion of the crank shaft 72 projecting outward from the belt cover 85, and an idler 98 is provided on the right side wall 64a of the engine body 64 to come into contact with the belt Ts.

A pulley 99 mounted on a water pump is provided between the pulley 95 and the crank pulley 80b on the right side wall 64a of the engine body 64. Pulleys 102 and 103 are respectively mounted on an alternator 101 and a compressor for an air conditioner fixed to the second cylinder bank 64B. A belt Tw is engaged with each of the pulleys 99, 102 and 103 and a crank pulley 80c mounted on the end portion of the crank shaft 72 projecting outward from the belt cover 85, with an idler 104 is provided on the right side wall 64a of the engine body 64 to come into contact with the belt Tw.

Figure 15:
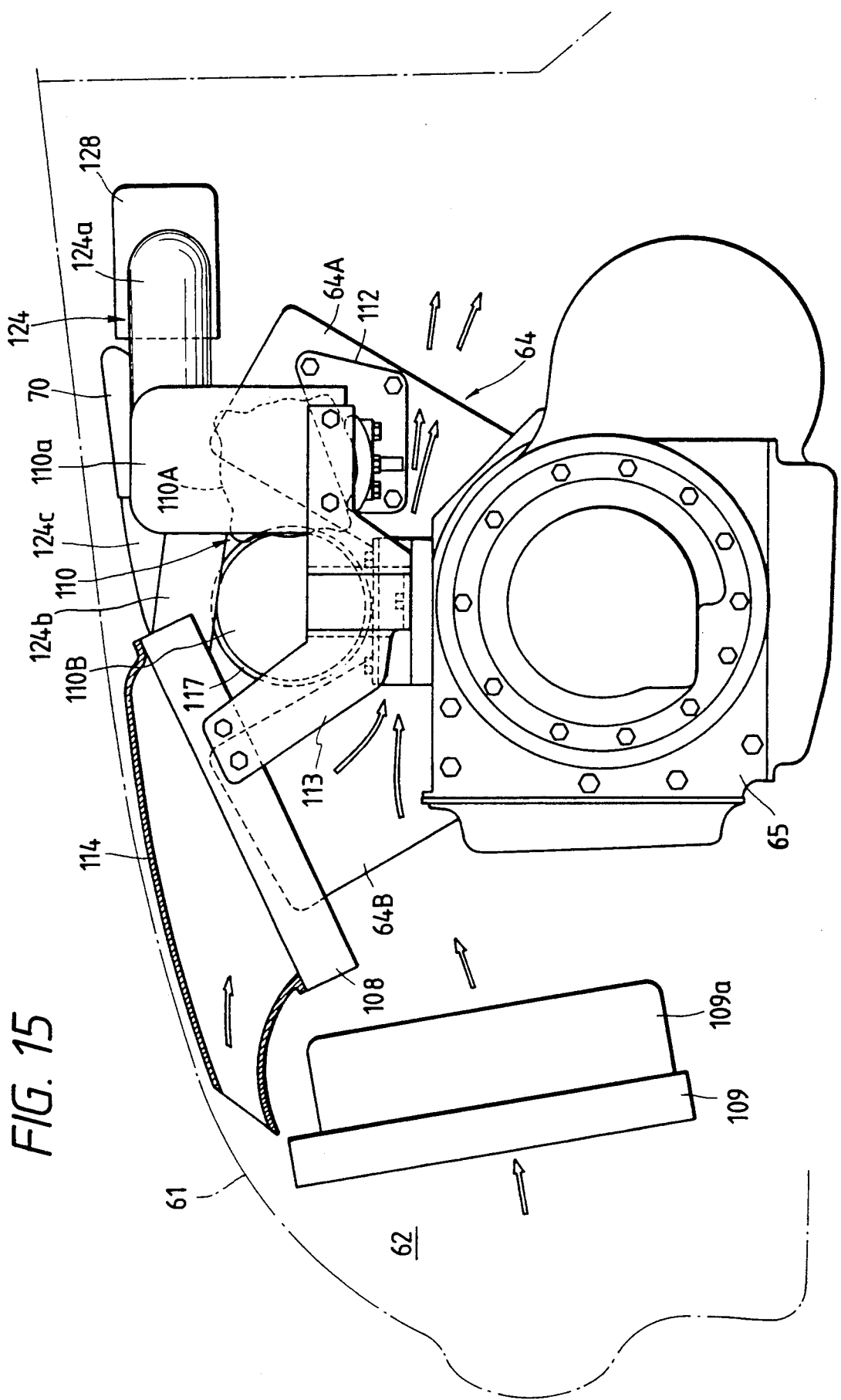
FIG. 15 is a schematic rear view of the vehicle engine shown in FIG. 10.

As shown in FIG. 15, an intercooler 108 constituting a part of the air feeding system is disposed above the transmission contained in the transmission case 65 to be close to the second cylinder bank 64B. The intercooler 108 is secured to the second cylinder bank 64B through a bracket 107 attached to the side portion of the engine body 64, and an air intake duct 114 is provided on the intercooler 108 with an opening directed forwardly to cause air introduced therein from the opening to pass through the intercooler 108.

A radiator 109 accompanied with a couple of fan cases 109a and constituting a part of a cooling water circulating system is disposed in front of both the engine body 64 and the transmission case 65 to be forwardly slanted. One of the fan cases 109a is directed to face a space between the intercooler 108 and the transmission case 65.

An engine-driven supercharger 110 is disposed above the transmission contained in the transmission case 65 to be close to the first cylinder bank 64A. The engine-driven supercharger 110 is supported upwardly by a bracket 112 attached to the first cylinder bank 64A and further supported laterally by a bracket 113 attached to the transmission case 65 so as to have a center axis thereof extending along the crank shaft 72. This engine-driven supercharger 110 comprises a main body 110A containing a pair of screw rotors engaging with each other and extending in parallel with the center axis and a speed-up gear mechanism 110B connected with the output portion of the electromagnetic clutch 117. The input portion of the electromagnetic clutch 117 is connected with the one end of the rotary shaft 92. A cover 110a is secured to the main body 110A of the engine-driven supercharger 110 and the bracket 113 is connected to the cover 110a.

A certain space is formed between the engine-driven supercharger 110 and the transmission case 65 to be provided with the bracket 113, as shown in FIG. 13, and the intercooler 109 is positioned ahead of the engine-driven supercharger 110. Therefore, each of air flow directed through the air intake duct 114 and the intercooler 108 toward the rear portion of the engine room 62 and air flow directed through the radiator 109 and the fan case 109a toward the rear portion of the engine room 62 moves smoothly through the space formed between the engine-driven supercharger 110 and the transmission case 65 to the rear portion of the engine room 62 as indicated with arrows in FIG. 15, so that each of the intercooler 108 and the radiator 109 is improved in heat radiating function and the engine-driven supercharger 110 is effectively cooled.

As shown in FIG. 10, an air intake 118 is disposed at a front end portion of the engine room 62 with its front end opening outward. A rear end of the air intake 118 is connected with an air cleaner 120 which disposed at a front portion of the right side half of the engine room 62 to be positioned in front of the suspension tower 62a. The air cleaner 120 has an outlet opening at the upper end thereof and the outlet end is connected to an air flow sensor 126 connected to an upstream end of a inlet passage 124.

The inlet passage 124 includes a first portion 124a which interconnects the air flow sensor 126 and the engine-driven supercharger 110 through a resonance chamber 127, a first throttle body 128 containing a main throttle valve controlled by an accelerating pedal disposed in the cabin, and a second throttle body 129 containing an auxiliary throttle valve operating in response to movements of the first throttle valve with a predetermined time lag. A second portion 124b of the inlet passage 124 interconnects the engine-driven supercharger 110 and the intercooler 108, with a third portion 124c which, interconnecting the intercooler 108 and the surge tank 70. The inlet passage further includes an air bypass 125 which interconnects a part of the first portion 124a between the first throttle body 128 and the second throttle body 129 and a part of the third portion 124b close to the surge tank 70 through an air flow controller 125A, and the separated inlet passages 68 and 69. Such an arrangement including the inlet passage 124 and the devices interconnected through the first, second and third portions 124a, 124b and 124c of the inlet passages 124, which constitutes a main part of the embodiment of air feeding system for a vehicle engine equipped with a supercharger according to the present invention, feeds the cylinders in the first and second cylinder banks 64A and 64B with intake air introduced through the air intake 118 into the air cleaner 120.

The first portion 124a of the inlet passage 124 is arranged to extend backward from the air flow sensor 126 so as to reach a position above the first cylinder bank 64A which is backwardly slanted toward the dash panel 63 and then to extend along a path between the surge tank 70 disposed above the first cylinder bank 64A and the dash panel 63 from the right side half of the engine room 62 to the left side half of the engine room 62. In this arrangement the a downstream end thereof, which extends from the second throttle body 129, reaches an upper portion of the cover 110a of the engine-driven supercharger 110. The downstream end of the first portion 124a of the inlet passage 124 is connected with an opening provided on the cover 110a of the engine-driven supercharger 110. Accordingly, the first portion 124a of the inlet passage 124 is formed to be relatively long without a port bent at an acute angle, so that resistance against intake air flowing through the first portion 124a of the inlet passage 124 is desirably reduced and noise caused by intake air flow through the engine-driven supercharger 110 to get away from the air cleaner 120 is effectively suppressed. Further, the first portion 124a of the inlet passage 124 does not reduce so much the space at the rear portion of the engine room 62.

The first portion 124a of the inlet passage 124 is adjacent to the surge tank 70 so that the part of the first portion 124a between the first throttle body 128 and the second throttle body 129 is caused to be adjacent to the part of the third portion 124c of the inlet passage 124 close to the surge tank 70. Therefore, the air bypass 125 is reduced in length and provided with reduced resistance against intake air flowing therethrough.

The air flow controller 125A provided on the air bypass 125 contains a diaphragm actuator connected through a negative pressure passage 125a to the surge tank 70 and a control valve driven by the diaphragm actuator to open and close the air bypass 125 selectively.

Incidentally, a battery 134 is disposed above the transmission case 65 in the left side portion of the engine room 62.

With the configuration described above, when the engine body 64 is operated, the rotation of the crank shaft 72 is transmitted through the cogged endless belt T to both the cam pulley 78 provided to the first cylinder bank 64A and the cam pulley 79 provided to the second cylinder block 64B and therefore the camshafts 74 to 77 are rotated. The rotation of the crank shaft 72 is also transmitted through the belt Ts to both the pulleys 95 and 97, so that the oil pump is driven and the input portion of the electromagnetic clutch 117 is rotated through the rotary shafts 90, 91 and 92. The input portion and the output portion of the electromagnetic clutch 117 are not interconnected so that the engine-driven supercharger 110 is kept inoperative when each of the engine speed of the engine body 64 and the opening degree of the main throttle valve is less than a predetermined value. When the engine-driven supercharger 110 is kept inoperative, the control valve contained in the air flow controller 125A is operative to open the air bypass 125a so that intake air having passed through the main throttle valve contained in the first throttle body 128 (which is provided on the first portion 124a of the inlet passage 124) is introduced through the air bypass 125a and a downstream part of the third portion 124c of the inlet passage 124 into the surge tank 70. In such a case, since the air bypass 125A is provided with the reduced resistance against the intake air flowing therethrough, the intake air is effectively supplied to the surge tank 70. Further, when the engine-driven supercharger 110 is kept inoperative, the auxiliary throttle valve contained in the second throttle body 129 is kept closed to restrain intake air mass flow to the engine-driven supercharger 110 from the first portion 124a of the inlet passage 124. Accordingly, a difference between air pressure in the second portion 124b of the inlet passage 124 (at a position downstream from the engine-driven supercharger 110) and compressed pressure (produced by the engine-driven supercharger 110) is relatively small when the engine-driven supercharger 110 starts operating, and therefore crashing sound at the start of the engine-driven supercharger 110 is reduced.

When each of the engine speed of the engine body 64 and the opening degree of the main throttle valve is equal to or more than the predetermined value, the input portion and the output portion of the electromagnetic clutch 117 are interconnected so that the rotation of the rotary shafts 90, 91 and 92 is transmitted through the electromagnetic clutch 117 and the speed-up gear mechanism 110B to the engine-driven supercharger 110 and therefore the engine-driven supercharger 110 is operated. When the engine-driven supercharger 110 operates, intake air supplied through the first portion 124a of the inlet passage 124) to the engine-driven supercharger 110 is compressed by the engine-driven supercharger 110 and then supplied through the intercooler 108 to the surge tank 70.

The intake air thus supplied to the surge tank 70 is fed through the separated inlet passages 68 and 69 to the cylinders in the first and second cylinder banks 64A and 64B.

Incidentally, the rotation of the crank shaft 72 is further transmitted through the belt Tw to each of the water pump, compressor for the air conditioner and alternator 101 to drive the same.

Figure 16:
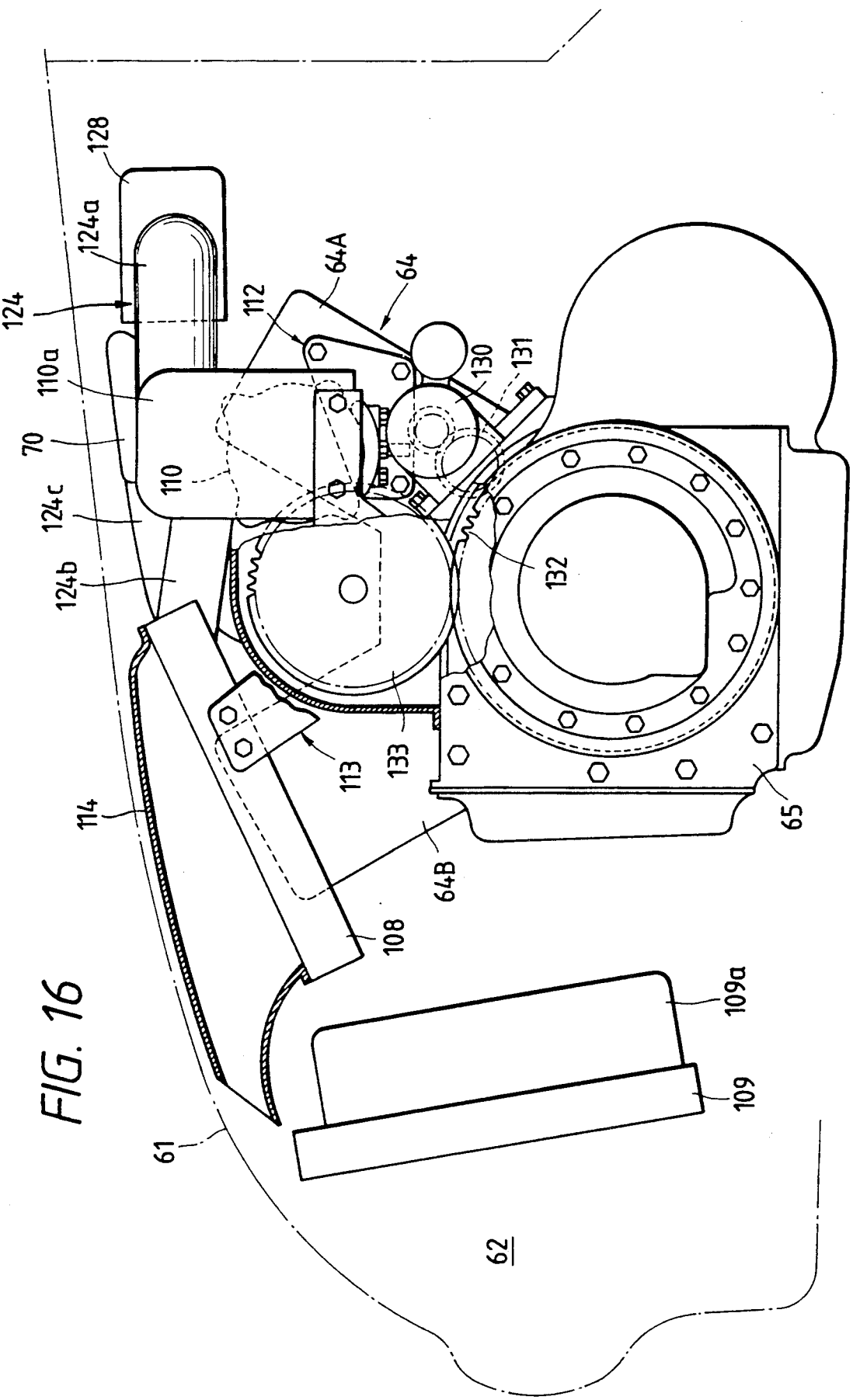
FIG. 16 is a schematic illustration showing a further embodiment of air feeding system for a vehicle engine equipped with a supercharger according to the present invention, together with the vehicle engine to which the embodiment is applied.

A further embodiment of air feeding system for a vehicle engine equipped with a supercharger according to the present invention is shown in FIG. 16. This embodiment is also applied to a vehicle engine of the V-type with six cylinders. In FIG. 16, portions, parts and devices corresponding to those of FIGS. 10 to 15 are marked with the same references and further description thereof will be omitted.

In the embodiment shown in FIG. 16, an engine-driven supercharger 110 is secured to a first cylinder bank 64A of an engine body 64 and a transmission case 65 in the same manner as that of the embodiment shown in FIGS. 10 to 15. However, the engine-driven supercharger 110 in the embodiment of FIG. 16 is driven by a gear 132 which is provided on the peripheral portion of a flywheel mounted on a crank shaft to be positioned at the input end of a transmission contained in the transmission case 65, without using the rotary shafts 90, 91 and 92 employed in the embodiment shown in FIGS. 10 to 15. In such a case, the rotation of the gear 132 rotating in accompany with the crank shaft is transmitted through a intermediate gear 133, an electromagnetic clutch, a speed-up gear mechanism to the engine-driven supercharger 110. The gear 132 is engaged through an intermediate gear 131 to an engine starter 130.

Other portions of the embodiment of FIG. 16 are arranged in the same manner as those of the embodiment shown in FIGS. 10 to 15 and the operation for feeding cylinders in first and second cylinder banks 64A and 64B is conducted also in the same manner as that of the embodiment shown in FIGS. 10 to 15.

With such a configuration employing the ring gear 133 for driving the engine-driven supercharger 110, engine power required for driving the engine-driven supercharger 110 is reduced and therefore the engine body 64 can be reduced in capacity and size.

Further, other advantages which correspond to the advantages obtained in the embodiment shown in FIGS. 10 to 15 as described above also obtained in the embodiment of FIG. 16.

What is claimed is:

1. An air feeding system for a vehicle engine equipped with a supercharger with the engine disposed in an engine room, said engine room having front portions which are leading when the vehicle is traveling in a forward direction, said engine room having side halves extending from a substantially central portion of the engine room in directions perpendicular to forward movement of the vehicle, the air feeding system comprising:

an inlet passage provided in an engine room with its first section interconnecting an air cleaner and a throttle valve, its second section interconnecting the throttle valve and the supercharger, and its third section interconnecting the supercharger and an engine body of the vehicle engine for feeding a cylinder in the engine body with intake air introduced through the air cleaner into the first section, wherein said air cleaner is disposed at a front portion of one side of the engine room, said supercharger is disposed in the other side half of the engine room, and a part of said inlet passage including said first and second sections is arranged to extend backward or away from the forward vehicle direction from the air cleaner and then to extend further along a dash panel forming a rear end of the engine room from said one side half to said other side half of the engine room so as to reach the supercharger, wherein said rear end is trailing with respect to said front portion when the vehicle is moving in the forward direction.

2. An air feeding system according to claim 1, wherein said third section of the inlet passage interconnects the supercharger and the engine body of the vehicle engine through an intercooler disposed at a front portion of said other side half of the engine room.

3. An air feeding system according to claim 2, wherein an air intake is provided at a front portion of the engine room to extend forward from the air cleaner.

4. An air feeding system according to claim 3, wherein said first section of the inlet passage interconnects the air cleaner and the throttle valve through an air flow sensor disposed behind the air cleaner in said one side half of the engine room.

5. An air feeding system according to claim 3, wherein said throttle valve is disposed behind the supercharger in said other side half of the engine room.

6. An air feeding system according to claim 3, wherein said third section of the inlet passage includes at its downstream end portion an intake manifold connected to the engine body of the vehicle engine.

7. An air feeding system according to claim 6, wherein said intake manifold is provided with a plurality of separated inlet passages each having one end connected to the engine body of the vehicle engine and a collecting passage to which the other end of each of said separated inlet passages is connected, and an air bypass is provided for interconnecting said second section of the inlet passage and said collecting passage of the intake manifold to detour said supercharger and said intercooler.

8. An air feeding system according to claim 7, wherein said air bypass is connected through a valve body which contains a valve operative to open and close said air bypass selectively and is disposed on said intake manifold.

9. An air feeding system according to claim 1, wherein said supercharger is positioned above a case containing a power transmitting mechanism coupled with one end portion of said engine body.

10. An air feeding system according to claim 9, wherein said part of the inlet passage including said first and second sections is arranged to be partially disposed above a cylinder head portion of said engine body slanted backward to be adjacent to said dash panel.

11. An air feeding system according to claim 10, wherein an air intake is provided at a front portion of the engine room to extend forward from the air cleaner.

12. An air feeding system according to claim 11, wherein said first section of the inlet passage interconnects the air cleaner and the throttle valve through an air flow sensor disposed behind the air cleaner in said one side half of the engine room.

13. An air feeding system according to claim 11, wherein said third section of the inlet passage includes at its downstream end portion a surge tank and a plurality of separated inlet passages each interconnecting said surge tank and said engine body.

14. An air feeding system according to claim 13, wherein said surge tank is disposed above said cylinder head portion of said engine body, and an air bypass is provided for interconnecting said second section of the inlet passage and a portion of said third section of the inlet passage adjacent to said surge tank.

15. An air feeding system according to claim 14, wherein said throttle valve is disposed to be adjacent to said surge tank.

* * * * *